Figure 5:
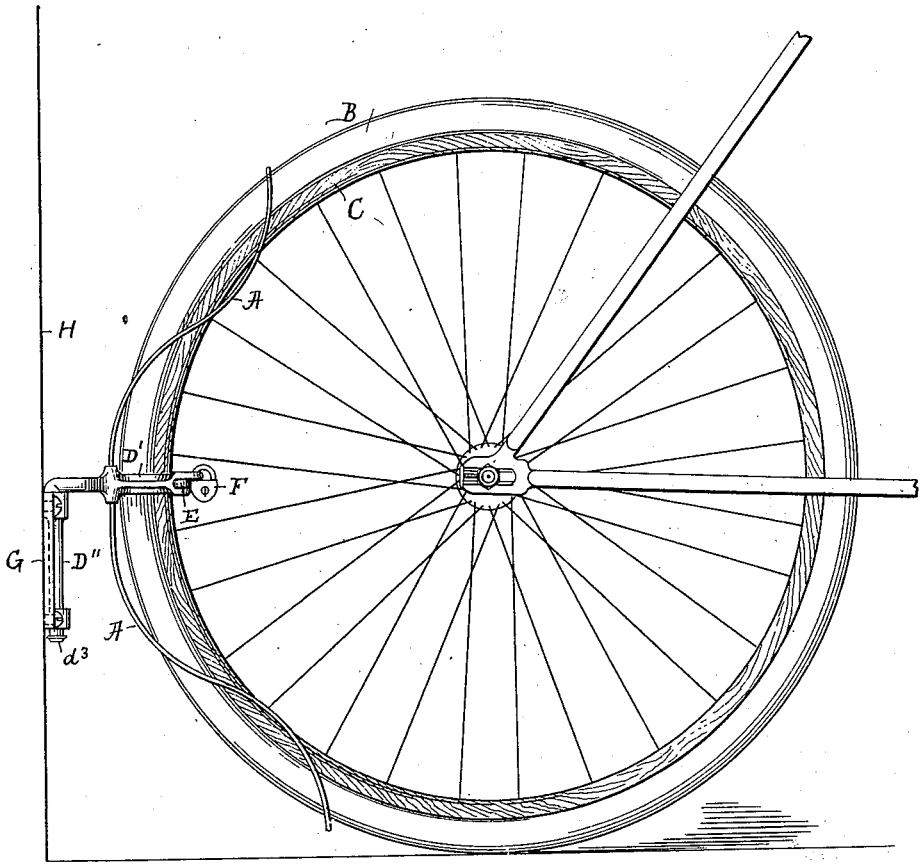

No. 639,517. Patented Dec. 19, 1899.
C. BUTCHER.
BICYCLE RACK AND LOCKING DEVICE.
(Application filed June 16, 1899.)
(No Model.) 2 Sheets—Sheet 1.
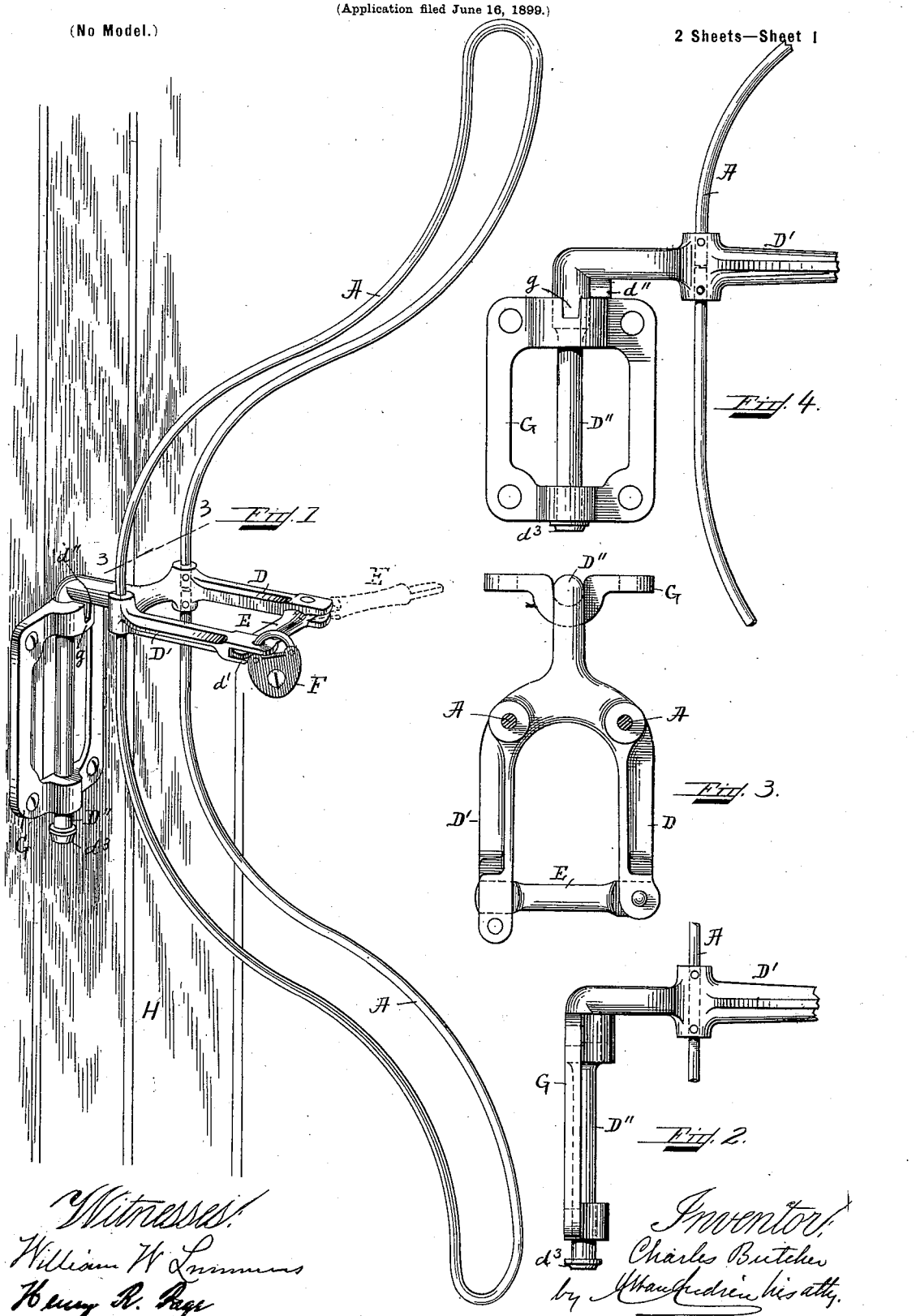
Witnesses:
William W. Lummus
Henry R. Page
Inventor:
Charles Butcher
by ... his atty.

No. 639,517. Patented Dec. 19, 1899.
C. BUTCHER.
BICYCLE RACK AND LOCKING DEVICE.
(Application filed June 16, 1899.)

(No Model.) 2 Sheets—Sheet 2.

UNITED STATES PATENT OFFICE.

CHARLES BUTCHER, OF CAMBRIDGE, MASSACHUSETTS.

BICYCLE-RACK AND LOCKING DEVICE.

SPECIFICATION forming part of Letters Patent No. 639,517, dated December 19, 1899.

Application filed June 16, 1899. Serial No. 720,758. (No model.)

*To all whom it may concern:*

Be it known that I, CHARLES BUTCHER, a citizen of the United States, residing at Cambridge, in the county of Middlesex and State of Massachusetts, have invented new and useful Improvements in Bicycle-Racks and Locking Devices, of which the following is a specification.

This invention relates to improvements in a combined bicycle-rack and locking device for the purpose of holding a bicycle in an upright position and securely locking it when not in use, as will be hereinafter more fully shown and described, reference being had to the accompanying drawings, wherein—

Figure 1 represents a perspective view of the device. Fig. 2 represents a partial side elevation of Fig. 1. Fig. 3 represents a horizontal section on the line 3 3, shown in Fig. 1. Fig. 4 represents a front view of the wall-bracket or hinge-plate, showing the rack or wheel-holder swung to one side; and Fig. 5 represents a side elevation of the device, showing the rear wheel of a bicycle held and locked therein.

Similar letters refer to similar parts wherever they occur on the different parts of the drawings.

The wheel-rack comprises an arched or longitudinally-curved loop composed of two lateral parallel arms or members joined at the top and bottom and between which a portion of the bicycle-wheel may be inserted.

The letter $d$ indicates a yoke provided with two bosses $d'$, each of which is perforated vertically, as shown, to form sockets through which the bilateral members of the wire rack pass and in which they are secured in any suitable manner. Formed integrally with the yoke $d$ are two parallel and horizontally-projecting forked locking-arms D D', arranged to receive between them the rim and tire of a bicycle-wheel inserted in the wire rack. To one of said locking-arms—the one marked D—is pivotally connected a lock-bar E, the free end of which is adapted to be received in a forked recess $d'$ in the outer end of the arm D' and to be secured thereto by means of a suitable lock F, the bail of which is passed through a perforation in the outer end of the arm D' when it is desired to lock the wheel of the bicycle, as shown in Figs. 1 and 5.

In one piece with the forked arms D D' is made a vertical hinge-pin D", which is pivotally connected to a wall-bracket or hinge-plate G, adapted to be secured to the wall or other suitable object H, as shown.

The upper end of the hinge-plate G has a notch $g$, adapted to receive a tooth or projection $d''$, made integral with the upper end of the spindle D", and by such arrangement the forked wire rack or wheel-holder A is caused to be held at about a right angle to the wall H when said tooth or projection $d''$ is interlocked with the notch or recess $g$ on the wall-bracket G, as shown in Fig. 1.

The hinge-pin D" is made somewhat longer than the height of the bracket G, so that it may be raised upward sufficiently to cause the tooth $d''$ to be disengaged from the notch or recess $g$ whenever it may be desirable to swing the wheel-holder to one side, so as to be out of the way, as shown in Fig. 4.

The lower end of the hinge-pin D" is provided with a head or projection $d^3$, so as to prevent said hinge-pin from getting detached from the wall-bracket during the adjustment of the wheel rack or holder, as shown.

If it is desired to hold the rack locked in position at or about a right angle to the wall to which the wall-bracket is secured, all that is necessary to do is to interlock the tooth $g$ with the notch or recess $d''$ on the wall-bracket G, as shown in Fig. 1, when it will be held by gravity.

If it is desired to swing the rack or wheel-holder A to one side, so as to be out of the way, it may readily be done by raising the said rack sufficiently to cause the tooth $g$ to be disengaged from the notch $d''$ in the wall-bracket G, after which the rack may be swung more or less sidewise, as represented in Fig. 4.

The bicycle may readily be held in an upright position simply by placing one of its wheels, preferably the rear one, into the forked rack A, as shown in Fig. 5, and if it is desired to lock it in such position this may readily be done by swinging the lock-bar to the position shown in Figs. 1, 3, and 5 and securing it in position inside of the wheel-rim by means of any suitable lock F, as shown in Figs. 1 and 5.

The invention is very simple and serves as an effective means for holding and securing a bicycle in place, thus preventing its being carried away or stolen.

What I wish to secure by Letters Patent and claim is—

1. The herein-described bicycle-rack comprising a yoke having fixed therein the bilateral wire rack and provided with two parallel horizontally-projecting forked locking-arms, a vertical spindle depending from the rear portion of said yoke and provided with a laterally-projecting tooth or lug, and a fixed wall-bracket in which the spindle is journaled and vertically movable, said bracket being provided with a notch or recess in which the tooth or lug on the spindle is arranged to seat by gravity, substantially as described and for the purpose specified.

2. The herein-described bicycle-rack comprising a yoke provided with two vertical hollow bosses, a bilateral wire rack fixed in said bosses, two parallel forked locking-arms projecting horizontally from the front of the yoke, a vertical spindle depending from the rear portion of said yoke and provided with a laterally-projecting tooth or lug, and a fixed wall-bracket in which the spindle is journaled and vertically movable, said bracket being provided with a notch or recess in which the tooth or lug on the spindle is arranged to seat by gravity, substantially as and for the purpose specified.

3. A bicycle-rack, consisting of a wall-bracket, a yoke formed integral with a vertical spindle journaled in the wall-bracket, two opposite perforated bosses, and two horizontally-projecting locking-arms, a lock-bar pivoted at one end to one of said arms, means for locking the other end of said bar to the other projecting locking-arm, and the arched wheel-rack loop composed of two lateral, parallel arms or members passing through and fixed in said bosses, curved longitudinally and joined at the top and bottom, substantially as described.

In testimony whereof I have hereunto set my hand in presence of two subscribing witnesses.

CHARLES BUTCHER.

Witnesses:
ALBAN ANDRÉN,
CHAS. L. ABBOTT.